United States Patent
Ringen et al.

(10) Patent No.: US 6,764,018 B1
(45) Date of Patent: Jul. 20, 2004

(54) SECURE AUTODIAL IDENTIFICATION CARD SYSTEM AND METHOD

(75) Inventors: Deron J. Ringen, Kennesaw, GA (US); Brenda S. Wilch-Ringen, Kennesaw, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/159,746

(22) Filed: May 30, 2002

(51) Int. Cl.[7] .............................................. G06K 19/06
(52) U.S. Cl. ...................................... 235/492; 235/375
(58) Field of Search ................................ 235/380–381, 235/382, 382.5, 383, 375, 492, 493; 705/66; 379/355.01, 350, 354, 357.03, 357.01, 88.02, 91.01, 357.05, 345

(56) References Cited

U.S. PATENT DOCUMENTS

| | | | | |
|---|---|---|---|---|
| 5,636,271 A | * | 6/1997 | Paterno et al. ......... | 379/357.03 |
| 5,655,007 A | * | 8/1997 | McAllister ............... | 379/91.01 |
| 5,657,378 A | | 8/1997 | Haddock et al. ......... | 379/93.23 |
| 5,675,627 A | | 10/1997 | Yaker .......................... | 379/57 |
| 5,907,616 A | * | 5/1999 | Brogger et al. ............. | 713/172 |
| 6,028,926 A | * | 2/2000 | Henderson et al. .... | 379/357.03 |
| 6,042,005 A | | 3/2000 | Basile et al. ................ | 235/382 |
| 6,498,847 B1 | * | 12/2002 | Henderson et al. .... | 379/355.01 |
| 2002/0020745 A1 | | 2/2002 | Yap et al. ................... | 235/451 |

* cited by examiner

*Primary Examiner*—Thien Minh Le
(74) *Attorney, Agent, or Firm*—Thomas, Kayden, Horstemeyer & Risley, LLP

(57) ABSTRACT

Preferred embodiments of the present invention provide a system and method for a secure autodial identification card. The card contains memory for storing various personal and/or medical information about the holder of the card for access by selected agencies or individuals. The card also preferably provides the cardholder an ability to use the card to automatically dial preselected telephone numbers stored on the card.

46 Claims, 5 Drawing Sheets

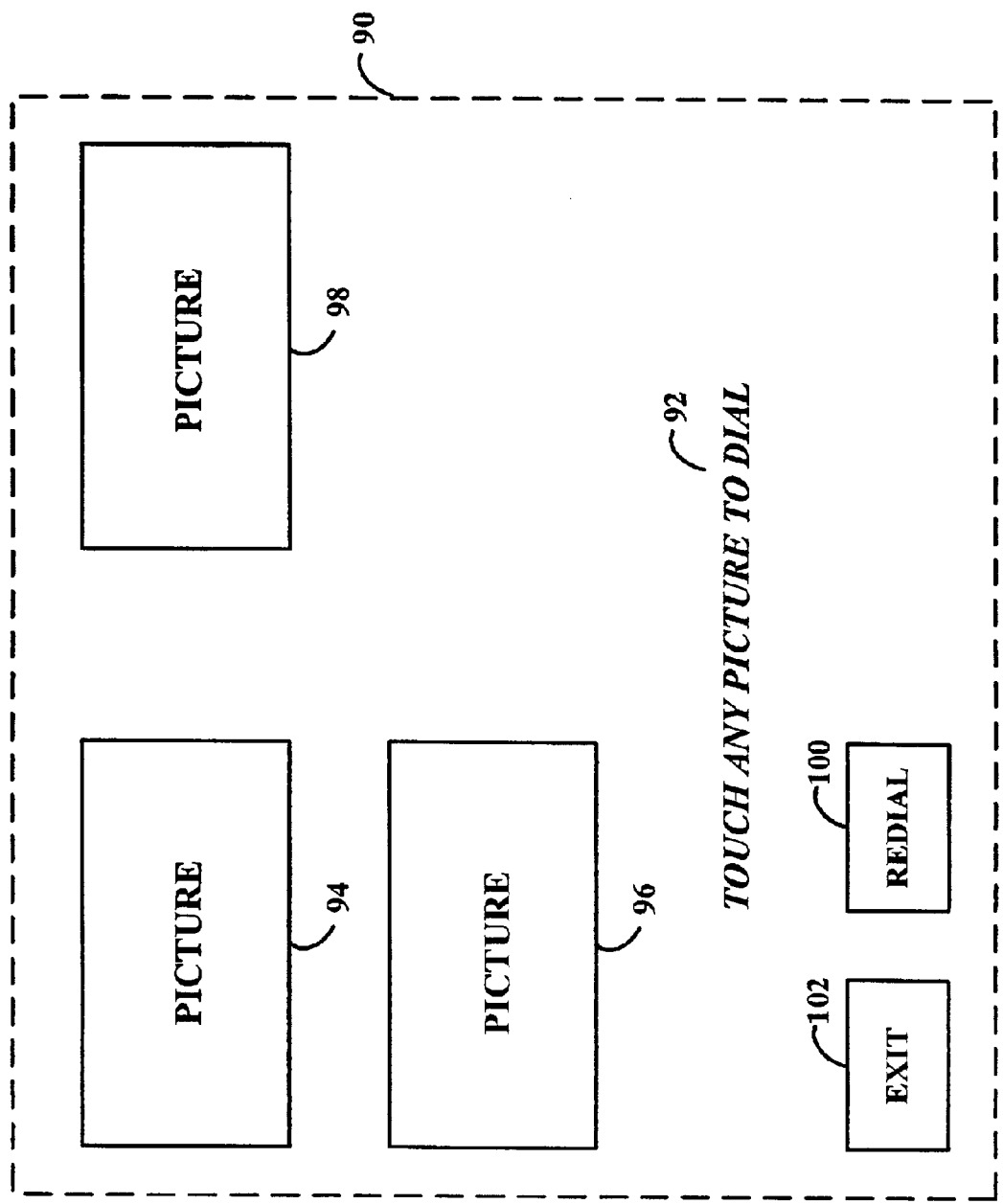

SECURE AUTODIAL IDENTIFICATION CARD SYSTEM AND METHOD

TECHNICAL FIELD

The present invention generally relates to telecommnunications, and more specifically, to secure identification cards.

BACKGROUND OF THE INVENTION

Smartcards, or credit card-style cards containing electronic or magnetic memory have become increasingly popular for various commercial applications. Smartcards are currently used for a variety of purposes, including retail purchases over the Internet. In general, a smartcard is used in association with a reader configured to access the data or information stored in the memory of the smartcard.

Similarly, there are various known uses of credit card type cards containing magnetic strips for use in connection with telephone services. Typically, such uses include prepaid long distance cards allowing a user to place a long distance call at a public telephone paid for through a credit card that the user has previously purchased for a specific amount of money. The amount of time available on the prepaid card to pay for a long distance call depends upon the amount paid for the card by the user. Additionally, telephone cards are currently used that are associated with an individual's home telephone number, such that the card may be used when an individual is travelling away from home, and all calls placed using the card are automatically charged to the individual's home telephone account.

There are also currently various types of personal identification cards and other devices used for personal identification of an individual, for instance in an emergency situation, or if the individual is a child, or if the individual is in some way incapacitated. Such information generally includes medical information typically printed onto a card, or printed and/or engraved onto an item worn by the user, such as a bracelet or pendant. However, the amount and type of information that can be printed on such a card, or engraved/imprinted on such an item carried or worn by the user, is limited to the available surface area of the card or item.

Thus there is a need for a system or method for addressing these and other problems.

SUMMARY OF THE INVENTION

The preferred embodiments of the present invention provide a system and method for a secure autodial identification card. The card contains memory for storing various personal and/or medical information about the holder of the card for access by selected agencies or individuals.

The card also preferably provides the cardholder an ability to use the card to automatically dial preselected telephone numbers stored on the card.

Other advantages and features of the present invention will become apparent to one skilled in the art upon examination of the following detailed description when read in conjunction with the accompanying drawings. It is intended that all such features and advantages be included herein within the scope of the present invention.

BRIEF DESCRIPTION OF THE DRAWINGS

Many aspects of the invention will be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 shows an exemplary graphical user interface for use with the system depicted in FIG. 3.

DETAILED DESCRIPTION OF THE PREFERRED EMBODIMENTS

Generally stated, the preferred embodiments of the present invention allow a vendor to provide a secure autodial identification card to a purchaser. The card preferably contains personal and/or medical information about the cardholder and further allows the cardholder to utilize the card with telephones, including swipe-to-bill telephones, in order to dial preselected telephone numbers that are stored on the card.

The purchaser of the card preferably provides the personal and/or medical information to be stored on a card, along with the desired telephone numbers that the card will be allowed to automatically call when used with a swipe-to-bill telephone. The information may be provided to the vendor in a number of ways, including through an application form sent to the vendor by mail or electronic mail, or by an on-line registration form completed by the purchaser. After receiving the information from the purchaser, the vendor programs the card and provides it to the purchaser. The vendor further supplies secure card readers to selected agencies for use with the identification functionality of the card.

Figure 1:
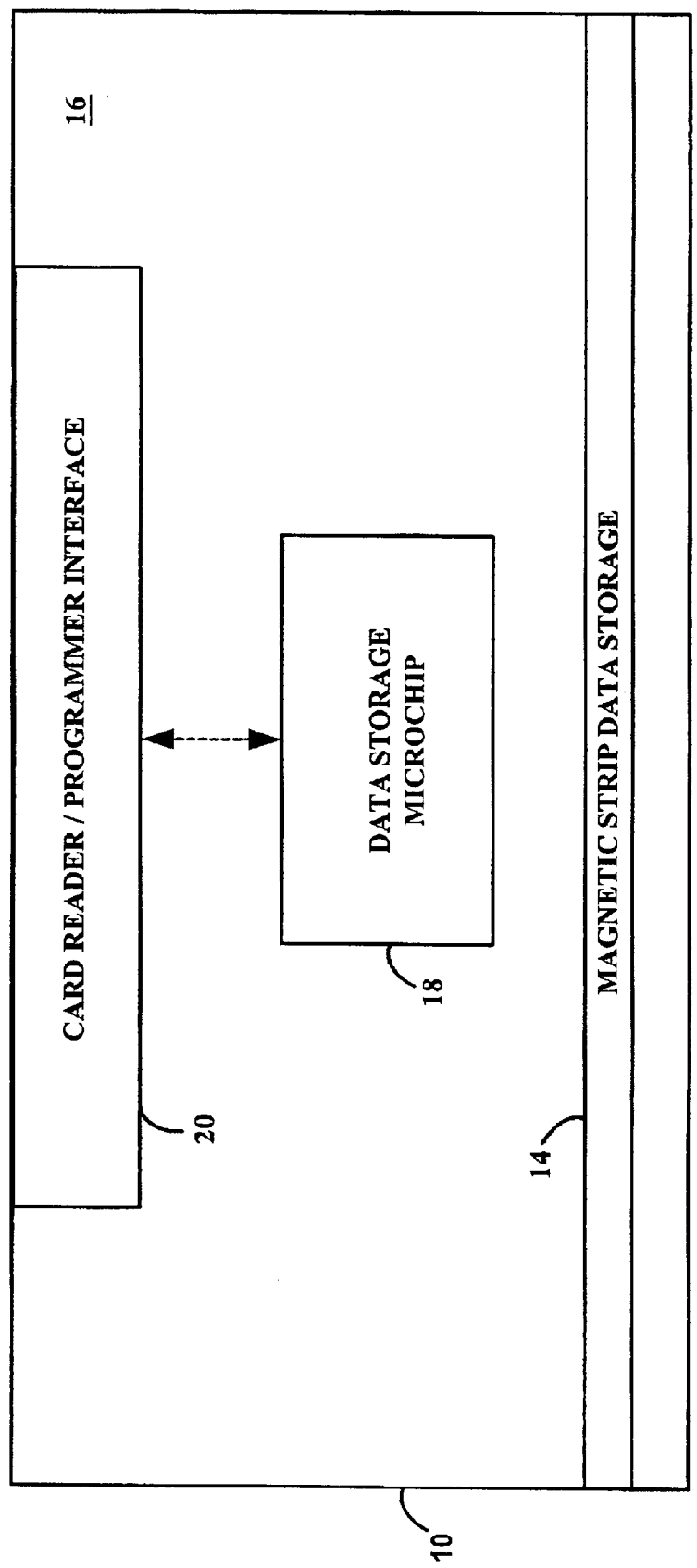
FIG. 1 is a block diagram illustrating selected components of one preferred embodiment of the present invention.

FIG. 1 illustrates select components of a card 10 of one preferred embodiment of the present invention. The card 10 is wallet-sized, and preferably the size of a credit card. As depicted in FIG. 1, the preferred card includes magnetic data storage 14, preferably in a strip configuration, mounted on a card body 16 for use with swipe-to-bill-type telephones. Additionally, the card 10 includes a microchip 18 embedded or affixed to the card 10 and an interface 20 in communication with the microchip 18. The information to be stored in the microchip 18 is programmed into the card 10 through the interface 20. The microchip 18 and strip 14 may be on the same or opposite sides of the card body 16.

The interface 20 is configured to allow the card 10 to be used with a reader such that the information stored on the microchip 18 of the card 10 may be accessed by, and copied to, the reader if desired. As would be known to one of ordinary skill in the art, there are various configurations for the interface 20, such that when the card 10 is engaged with a reader, the reader will communicate with the microchip 18 on the card 10, and access the information and data stored in the microchip 18.

In alternate embodiments, the card 10 may be configured with more than one microchip 18, each microchip 18 in communication with the interface 20, or each microchip 18 in communication with separate and distinct interfaces 20. Other embodiments include other types of memory storage.

Additionally, as would be known to one of ordinary skill in the art, there are various methods by which information or data may be stored on the microchip 18 of the card, and on the magnetic data storage 14 of the card. The information and/or data stored on the card 10 in some embodiments will be encrypted and/or compressed using various techniques known to one skilled in the art.

In one preferred embodiment, the magnetic data storage 14 performs a different function than the microchip 18. In the embodiment depicted in FIG. 1, the magnetic data storage 14 preferably stores functionality or instructions, and at the least, references at least one telephone number so that when the cardholder engages the card with a telephone 62, the telephone 62 will automatically dial at least one telephone number.

The magnetic data storage 14 may be used with a wide variety of telephones, including public swipe-to-bill telephones. In contrast, in the preferred embodiment, the microchip 18 of the card 10 stores personal and/or medical information concerning a cardholder, and the interface 20 of the card 10 is configured to communicate with only selected readers. Thus, the personal information stored on the microchip 18 will not be accessible to a wide variety of smartcard readers. Instead, the card 10 will preferably communicate with dedicated readers (such as reader 30 shown in FIG. 2 and discussed below) preferably configured to only to be used with the card 10 by certain selected agencies and individuals, such as, among others, the fire department, police department, hospitals, Emergency Medical Technicians, other emergency groups, authorities, etc.

Personal Identification Functionality

Figure 2:
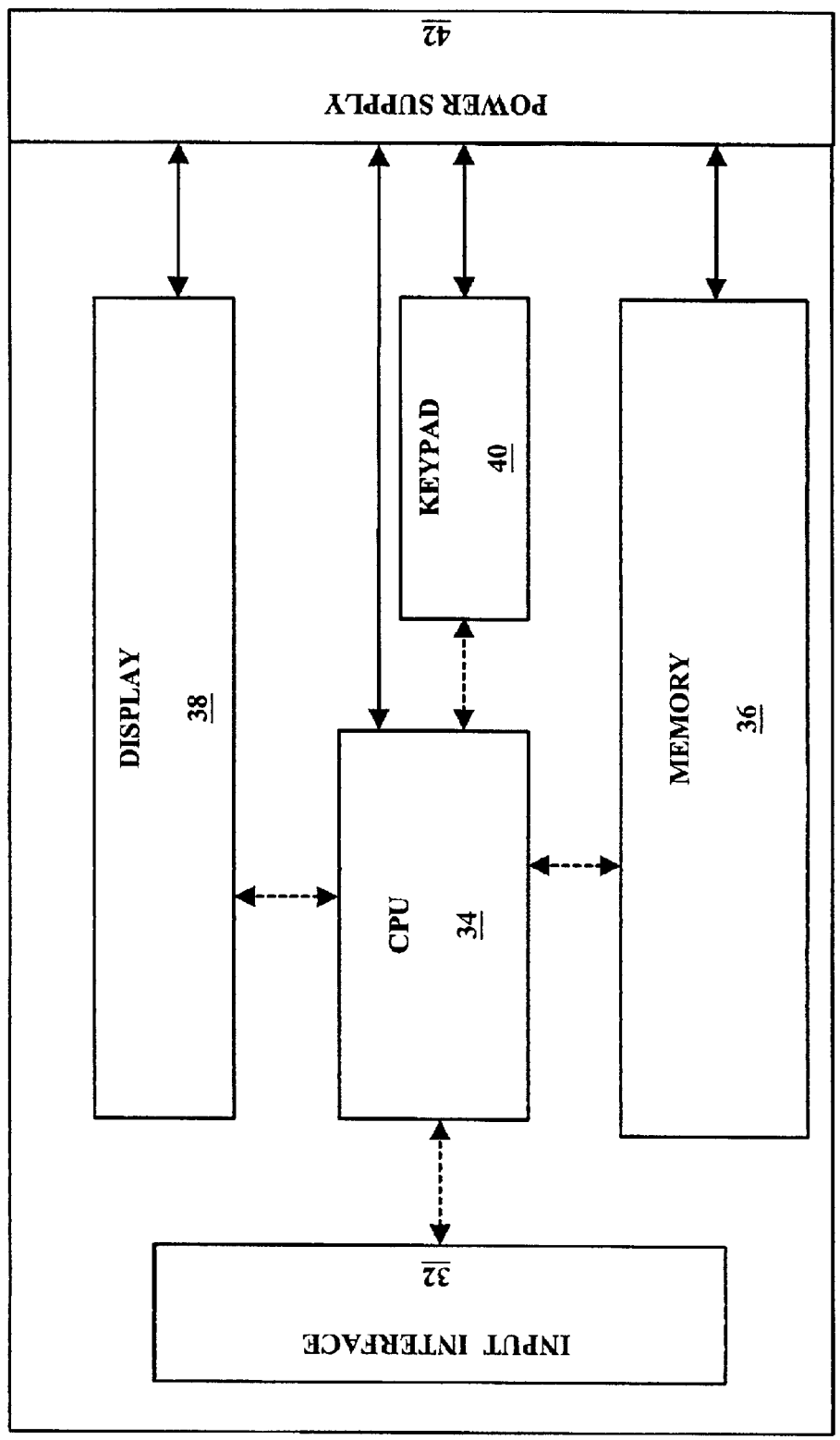
FIG. 2 is a block diagram of selected components of a reader for use with the preferred embodiment depicted in FIG. 1.

FIG. 2 depicts a block diagram of selected elements of an exemplary reader 30 for use with the preferred embodiment of the card 10 depicted in FIG. 1. As shown in FIG. 2, the reader 30 has an input interface 32. The input interface 32 is configured to communicate with the card 10 (FIG. 1), through the interface 20, when the card 10 (FIG. 1) is engaged with the reader 30. In the preferred embodiment, the reader's input interface 32 will be configured to communicate with the card 10 (FIG. 1) when the card 10 (FIG. 1) is inserted into a slot in the housing of the reader 30. However, other methods of engaging the card 10 (FIG. 1) with the reader 30 are possible to establish a communication between the input interface 32 of the reader 30 and the interface 20 (FIG. 1) of the card 10 (FIG. 1) as would be known to one skilled in the art.

Additionally, the preferred reader 30 will include a central processing unit (CPU) 34 in communication with the input interface 32, a memory 36, and a display 38. The display 38 allows the information stored on the microchip 18 (FIG. 1) of the card 10 (FIG. 1) to be viewed by an operator of the reader 30.

The preferred reader 30, will also preferably include a user or operator input in communication with the CPU 34, such as a keypad 40, to allow the operator of the reader 30 to interact with the reader 30, such as, for example, when information is shown on the display 38 responsive to the card 10 (FIG. 1) being engaged with the reader 30. Additionally, the preferred reader 30 will include a power supply 42. In the preferred embodiment, the reader 30 is not generally available to the public, but would only be distributed and/or sold to various emergency agencies or individuals that would typically have need of the personal and/or medical information stored on the card 10 (FIG. 1), such as in an emergency, or when the cardholder is unconscious, incapacitated, or a lost child.

In one preferred embodiment, the CPU 34 and/or memory 36 of the reader 30 will include software and/or operating instructions, which may include software to read encrypted data if the data stored in the microchip 18 (FIG. 1) of the card 10 (FIG. 1) is stored in an encrypted format.

Further, the preferred reader 30 will have a display 38 capable of showing various types of personal and/or medical information that may be stored on the microchip 18 (FIG. 1), including, without limitation, pictures, such as a photograph of the cardholder and/or the cardholder's relatives if desired. In addition, other information, such as text information which may include the cardholder's name, data of birth, home address, home telephone, emergency contacts, medical history, medical information pertinent to emergency treatment, as well as x-rays or other pictures or graphical information relevant to the cardholder's medical history if desired.

In one preferred embodiment, the reader 30 is a stand-alone device, not dependent on any other device in order to access the information stored in the microchip 18 (FIG. 1) of the card 10 (FIG. 1), and show the information to the operator of the reader 30 through the display 38. Additionally, the preferred reader 30 can be configured to communicate with other similar readers 30, such that there may be a network of readers 30 each reader 30 in communication with the other readers 30 in the network.

Similarly, in alternative embodiments, the reader 30 may be a peripheral used in connection with a computer, connecting to and communicating with the computer in various manners that would be known to one skilled in the art.

In these embodiments where the reader 30 is in communication with other readers 30 and/or is acting as a peripheral to a computer, the reader 30 will include other elements not shown in FIG. 2 to enable such communications, including input/output ports, serial ports or connectors, and/or parallel ports or connectors, as would be known to one skilled in the art.

In operation, the card 10 (FIG. 1) engages the reader 30 in some manner to allow the connection of the interface 20 (FIG. 1) of the card 10 (FIG. 1) with the input interface 32, of the reader 30. In the preferred embodiment, the card 10 is inserted into an opening of the reader 30, causing the interface 20 (FIG. 1) of the card 10 (FIG. 1) to come into contact with the input interface 32 of the reader 30. Once inserted into the reader 30, the data stored on the microchip 18 (FIG. 1) of the card 10 (FIG. 1) maybe accessed by the reader 30.

In a preferred embodiment, the information contained on the microchip 18 (FIG. 1) will be encrypted or contain other security measures, such as a PGP, to ensure the security of the personal and/or medical information. In these embodiments, publicly available readers 30 will not be able to access any of the information contained on the microchip 18 (FIG. 1). Instead, readers 30 allowed to access the information in the microchip 18 on the card 10 (FIG. 1), will be configured to decrypt the information in the microchip, such as with a pre-programmed or predetermined PGP key, or other such decryption or security method only known to authorized operators of the reader.

In other embodiments, the card 10 (FIG. 1) will contain operating instructions, or software, preferably contained on the microchip 18 (FIG. 1) enabling the card 10 (FIG. 1) to send a query to the reader 30 when the card 10 (FIG. 1) is engaged with the reader 30. The query determines whether the reader 30 is allowed access to the information stored on the card 10 (FIG. 1). In these embodiments, the authorized reader 30 will be configured to respond to the query from the card 10 (FIG. 1) such that the card 10 (FIG. 1) may determine that the reader 30 is authorized to access the information in the microchip 18 (FIG. 1) of the card 10 (FIG. 1).

Once the determination is made that the reader 30 is authorized to access the information in the microchip 18 (FIG. 1), the operator of the reader 30 may access the information. In the preferred embodiment, if the reader 30 is determined not to be authorized to access the information in the microchip 18 (FIG. 1), no information from the microchip 18 (FIG. 1) will be displayed on the reader. In one preferred embodiment, the reader will display the information to the operator of the reader 30 through the display 38. Additionally, in the preferred embodiment, information contained on the card 10 (FIG. 1) may be copied to the memory 36 of the reader 30, or to the memory 36 or display 38 of a remote second reader 30 that the reader 30 is in communication with, if desired.

The operator will preferably use the keypad 40 or other input device of the reader 30 to assist in the review of the information contained in the microchip 18 (FIG. 1). For instance, the information stored in the microchip 18 (FIG. 1) may be divided into different groupings, categories, or chapters, such as address, emergency contacts, medical conditions, allergies, etc. These various groupings may be displayed to the operator of the reader 30 as menus where the operator uses the keypad 40, or other input device, to select the category or group of information desired.

Similarly, in other embodiments, the groupings may be presented through a graphical interface where the operator of the reader 30, uses the keypad 40, display 38 (if touch-screen type), or other input device, to access the desired category or group of information. In yet other embodiments, the information may be stored on the microchip 18 (FIG. 1) in a predetermined order with the keypad 40 or other input device used to move to the desired portion of the information.

In the preferred embodiment, the reader 30 may be in communication with other authorized readers 30 such that the information accessed from a card 10 by a first reader 30 may be transferred to the memory 36 of a second reader 30 in communication with the first reader, either through a direct connection, or indirect connection such as through a computer, telephone, or wireless network, and displayed to an operator of the second reader 30, even though the display 38 of the second reader 30 is not physically co-located with the first reader 30.

In this manner there may be a network of readers 30 able to share information accessed by one of the network of readers 30 if desired. For instance, such a network of readers 30 could be purchased by a town or municipality with multiple readers 30 being supplied to emergency agencies such as the fire department, police department, hospitals, etc, allowing communication of the information accessed by one reader 30 to the other readers 30, such as from a reader 30 in a police car at the scene of an accident to a reader 30 at a hospital.

Autodial Functionality

An additional feature of the card 10 in one preferred embodiment is the use of the magnetic data storage 14 for automatic dialing of at least one preselected telephone number programmed into the magnetic data storage 14. In one preferred embodiment, the purchaser of the card 10 provides the information to be stored on the card 10 to a vendor, and the vendor programs information into the magnetic data storage 14 and the microchip 18. The information related to the automatic dialing feature of the card 10 is preferably programmed into the magnetic data storage 14 in order to allow the card 10 to operate with public telephones, including public swipe-to-bill telephones that will dial at least one number automatically.

Figure 3:
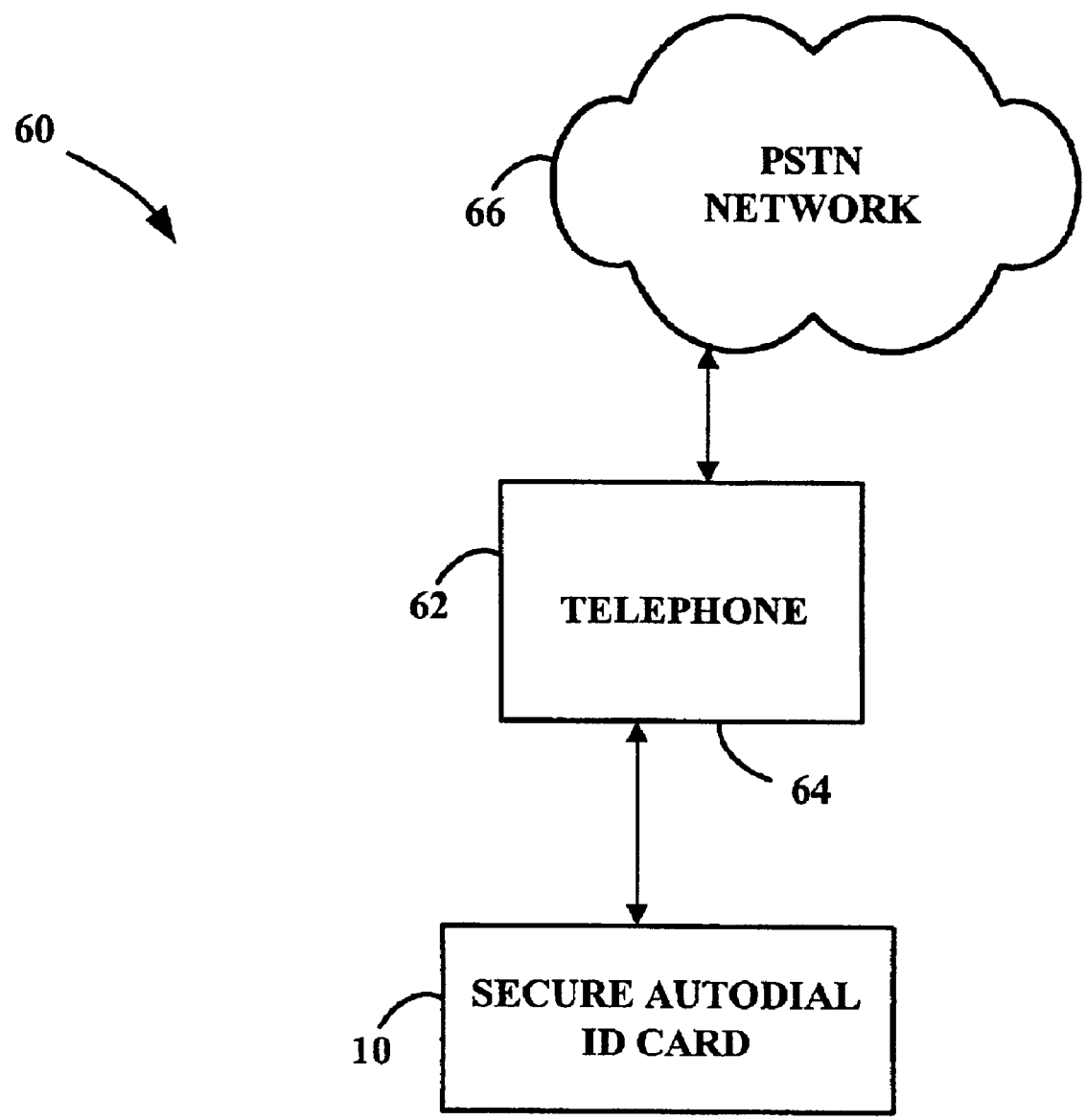
FIG. 3 is an exemplary system illustrating a use of the preferred embodiment depicted in FIG. 1 with an exemplary telephone.

FIG. 3 illustrates a system 60 implementing a preferred embodiment of an autodial function of the card 10 depicted in FIG. 1. As depicted in FIG. 3, the card 10 engages the telephone 62 through a swipe interface 64 on the telephone 62. The card 10 engages the swipe interface 64 in a variety of manners that would be known to one of ordinary skill in the art, including inserting the card 10 into the swipe interface 64 and then pulling the card 10 out, or sliding an edge of the card 10 containing the magnetic data storage 14 (FIG. 1) through a swipe interface 64 contained in a channel running substantially the length of the bottom of the telephone 62.

Once the card 10 engages the swipe interface 64 of the telephone 62, the swipe interface 64 reads the information contained in the magnetic data storage 14 (FIG. 1) of the card 10, and instructions, preferably, in the information on the card 10 cause the telephone 62 to automatically dial the telephone number stored in the magnetic data storage 14 (FIG. 1) of the card 10. Of course, the scope of the present invention includes practically any storage mechanism and/or information for effecting automatic dialing to at least one defined telephone number.

In some preferred embodiments, the magnetic data storage 14 (FIG. 1) of the card 10 may contain more than one telephone number. In some of these embodiments, the instructions in the information in the card 10 cause the telephone 62 to display and prompt the cardholder to select an image associated with the telephone number that the cardholder desires to automatically dial.

Once the cardholder makes the selection, or in the case of only one telephone number being stored in the magnetic data storage 14 (FIG. 1) of card 10, the instructions in the information on the card 10 preferably cause the telephone 62 to place the call to the telephone number through the Public Switched Telephone Network (PSTN) 66, or in alternative embodiments, through a local wireless service provider (not shown) if the telephone 62 is a wireless telephone.

If the telephone 62 is a public pay telephone, the automatic dialing function using the public telephone may be paid for through a variety of payment systems. In the preferred embodiment, a telephone service provider is the vendor of the card 10, and the purchase of the card 10 includes payment for the use of a card 10 for telephone calls to the numbers stored on the card 10 as part of the purchase price. In this embodiment, the information stored in the magnetic data storage 14 (FIG. 1) includes a signal to the telephone 62 to place the telephone call to the number stored in the magnetic storage 14 (FIG. 1) of the card 10, without the need for further payment.

In an alternative embodiment, the card 10 may be associated with the purchaser's home or wireless telephone service such that use of the card 10 at a public telephone 62 is automatically charged to the account associated with the purchaser's home or wireless telephone number.

In yet another embodiment, the purchase price of a card 10, includes a certain number of prepaid telephone calls, and the magnetic data storage 14 (FIG. 1) includes a signal to the telephone 62 when the card 10 is engaged with the swipe interface 64 of the telephone 62. In this embodiment, the telephone 62 receives the signal from the card 10, which includes information relating to the number of prepaid calls remaining for the card 10. The telephone 62 determines whether any prepaid calls are left on the card 10, or whether the number of prepaid calls originally purchased have expired through previous uses of the card 10.

In this embodiment, if the number of prepaid calls stored in the magnetic data storage have not been used, the telephone 62 places a telephone call, and reduces the number of prepaid telephone calls stored in the magnetic data storage 14 (FIG. 1) of the card 10 by one call. Additionally, in this embodiment, additional prepaid calls may be purchased, and the data on the magnetic data storage 14 (FIG. 1) altered to reflect the number of additional calls allowed as a result of the purchase. Other swipe-to-bill methods of payments for automatically placing the telephone call to the number stored on the card may be implemented in various embodiments of the present invention.

Figure 4:
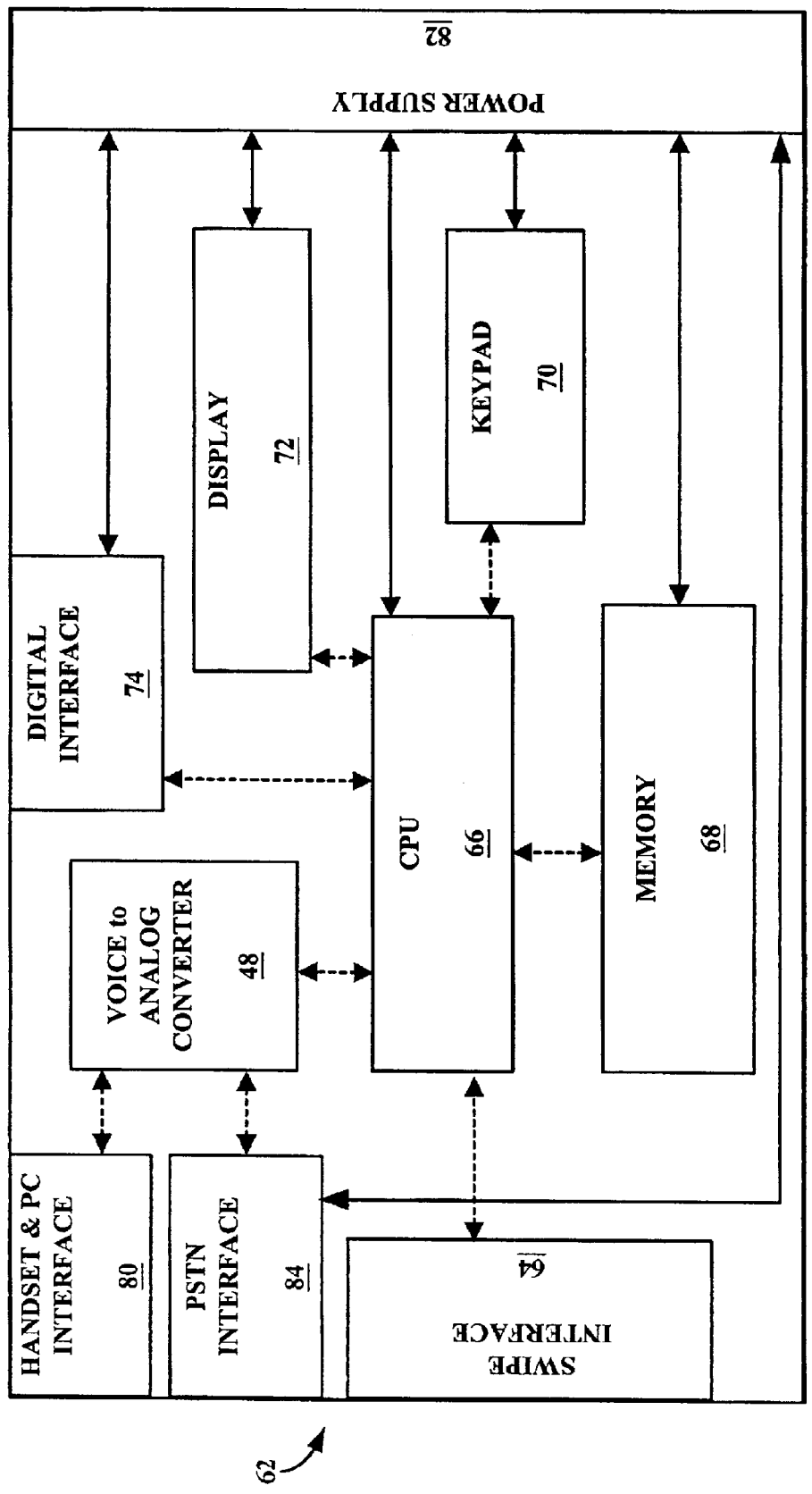
FIG. 4 is a block diagram of selected components of an exemplary telephone for use with the preferred embodiment depicted in FIG. 1.

FIG. 4 is a block diagram showing selected elements of an exemplary telephone 62 for use with the preferred embodiment of the card 10 depicted in FIG. 1 and FIG. 3. As depicted in FIG. 4, the telephone 62 will typically include a swipe interface 64 in communication with a CPU 66. Additionally, the phone 62 will include memory 68, as well as a keypad 70 and preferably a display 72, all in communication with the CPU 66.

In some embodiments, the telephone 62 will also include a digital interface 74 and a voice-to-analog converter 78 in communication with the CPU 66 as depicted in FIG. 4. Similarly, the preferred embodiment of the telephone 62 will include a handset and/or PC interface 80, a power supply 82, and a PSTN interface 84 for connecting to the PSTN 66 (FIG. 3). All of these various elements of the telephone 62 are in communication either directly or indirectly to the CPU 66.

In one preferred embodiment, the telephone 62 includes a display 72 capable of displaying graphical images to the cardholder when the cardholder uses the card 10 (FIG. 3) with the telephone 62.

In embodiments where only one telephone number is stored on the magnetic data storage 14 (FIG. 1) of the card 10 (FIG. 3) no further input from the cardholder is required other than engaging the card 10 (FIG. 3) with the telephone 62 through the swipe interface 64. In these embodiments, by engaging the card 10 (FIG. 3) with the telephone 62, the telephone number stored in the magnetic data storage 14 (FIG. 1) is automatically dialed by the telephone 62.

In the preferred embodiment where the magnetic data storage 14 (FIG. 1) contains more than one telephone number, the cardholder will preferably be prompted t6 select the telephone number to be dialed after the card 10 (FIG. 3) has engaged the swipe interface 64 of the telephone 62.

Once the card 10 (FIG. 3) has engaged the telephone 62, the telephone 62 will display graphical images associated with the telephone numbers stored in the magnetic data storage 14 (FIG. 1) of the card 10 (FIG. 3), but not the actual telephone numbers themselves. The cardholder selects the image associated with the desired telephone number, and the telephone 62 automatically places the call.

Preferably, the graphical image associated with each telephone number is stored on the magnetic data storage 14 (FIG. 1) of the card 10 (FIG. 3) along with the instructions for the telephone 62. When the card 10 (FIG. 3) engages the telephone 62, the instructions on the magnetic data storage 14 (FIG. 1) direct the telephone 62 to show the graphical images to the cardholder on the display 72 of the telephone 62, rather than showing the telephone numbers.

The graphic images to be displayed to the cardholder are stored in the magnetic data storage 14 (FIG. 1) of the card 10 (FIG. 3) and are communicated to the telephone 62 by engaging the card 10 (FIG. 3) with the telephone 62. The telephone number corresponding to each graphical image is also communicated to the telephone 62 along with the graphical image. Similarly, instructions to automatically place the call to the telephone number corresponding to the graphical images selected by the cardholder are also communicated to the telephone 62.

Thus by engaging the card 10 (FIG. 3) with the telephone 62, the telephone 62 displays graphical images to the cardholder, the cardholder selects a graphical image, and the telephone number corresponding with that graphical image is dialed by the telephone 62.

Use of the graphical images instead of displaying the actual telephone numbers provides security as the actual telephone numbers that may be dialed by the telephone 62 as a result of engaging the card 10 (FIG. 3) with telephone 64 are not listed to third-parties that may be observing the cardholder use the card 10 (FIG. 3), or that may have found a lost card 10 (FIG. 3). Similarly, the card 10 (FIG. 3) preferably may not be used to dial any telephone numbers except those stored in the magnetic data storage 14 (FIG. 1) of the card.

By using graphical images associated with certain telephone numbers, as opposed to the numbers themselves, the card 10 (FIG. 3) may be easily used by children, elderly people, persons with disabilities, handicaps, or medical conditions that make either viewing telephone numbers, or comprehending the numbers more difficult than viewing and responding to simple images.

FIG. 5 depicts a preferred graphical user interface ("GUT") 90 displayed to the cardholder through the display 72 (FIG. 4) of the telephone 62 (FIG. 4) in the preferred embodiment. As shown in FIG. 5, once the card 10 (FIG. 3) has been engaged with the telephone 62 (FIG. 4) through the swipe interface 64 (FIG. 4), various pictures 94, 96, 98 associated with individual telephone numbers are displayed to the user through the display 72 (FIG. 4) of the telephone 62 (FIG. 4).

In one preferred embodiment, the display 72 (FIG. 4) of the phone 62 (FIG. 4) is a touch screen display 72 (FIG. 4) such that selection of a picture 94, 96, 98 is made by touching the picture 94, 96, 98 on the screen of the display 72 (FIG. 4). Additionally, the preferred GUI 90 may include instructions 92 directing the user to touch any of the pictures 94, 96, 98 to automatically dial the telephone number associated with the picture 94, 96, 98.

As also depicted in FIG. 5, the preferred GUI 90 will include a redial button 100, that may be activated by the cardholder if the number selected by the cardholder by touching one of the pictures 94, 96, 98 is busy or otherwise may not be connected. By activating the redial button 100, the telephone number associated with the last selected picture 94, 96, 98 is automatically redialed.

When the cardholder is finished using the swipe function of the card 10 (FIG. 3) on the telephone 62 (FIG. 4), the exit button 102 shown on the preferred GUI 90 of FIG. 5 is be activated to end the interaction with the telephone 62 (FIG. 4).

As illustrated in FIG. 5, various pictures 94, 96, 98 may be used in accordance with a preferred embodiment of card 10 (FIG. 3). Preferably, the vendor will provide a variety of pictures that the purchaser of the card 10 (FIG. 3) may select from when purchasing the card 10 (FIG. 3). The purchaser of the card selects the desired picture 94, 96, 98, and selects a telephone number to be associated with the selected picture 94, 96, 98 when providing the information to the vendor of the card 10 (FIG. 3). The vendor stores on the magnetic data storage 14 (FIG. 1), the pictures 94, 96, 98, selected by the purchaser. The vendor also stores on the magnetic data storage 14 (FIG. 1) the telephone numbers selected by the purchaser, lining each telephone number to the selected picture 94, 96, 98 as specified by the purchaser.

When the card 10 (FIG. 3) is engaged with the swipe interface 64 (FIG. 4) of the telephone 62 (FIG. 4), the telephone 62 (FIG. 4) displays the GUI 90 containing the selected pictures 94, 96, 98 on the display 72 (FIG. 4) of the telephone 62 (FIG. 4). The cardholder touches the picture 94, 96, 98 displayed through the GUI 90, and the call is placed to the telephone number associated with the picture 94, 96, 98.

In the preferred embodiment, the pictures 94, 96, 98 will be readily identifiable by the cardholder with the telephone number associated with the picture 94, 96, 98, including the use of well-known images or symbols for the police, firefighters, hospital, the cardholder's home, the cardholder's immediate family, and other such well-known images.

It should be emphasized that the above-described embodiments of the present invention, particularly any "preferred" embodiments, are possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A secure autodial identification card for use by a cardholder, the card comprising:
    a card body;
    a memory interface connected to the card body; and
    a memory connected to the card body and memory interface, wherein the memory is configured to include identification information and autodial information wherein the autodial information further comprises a plurality of telephone numbers pertaining to the cardholder and a plurality of pictures each of the plurality of pictures associated with one of the plurality of telephone numbers.

2. The card of claim 1, wherein the memory further comprises a first memory and a separate second memory.

3. The card of claim 2, wherein the first memory contains the identification information.

4. The card of claim 3, wherein the identification information further comprises medical information pertaining to cardholder.

5. The card of claim 3, wherein the identification information further comprises images or pictures.

6. The card of claim 2, wherein the memory interface is configured to communicate the information contained in the first memory to a reader when the card is engaged with the reader.

7. The card of claim 6, wherein the reader is a dedicated reader.

8. The card of claim 7, wherein the dedicated reader is configured to operate only with the memory interface.

9. The card of claim 8, wherein the memory interface configured to operate only with the dedicated reader.

10. The card of claim 9, wherein the dedicated reader further comprises a plurality of dedicated readers.

11. The card of claim 10, wherein the plurality of dedicated readers further comprises a plurality of dedicated readers only available to emergency agencies.

12. The card of claim 2, wherein the second memory comprises a second microchip.

13. The card of claim 12, wherein the second microchip is in communication with a separate second memory interface.

14. The card of claim 2, wherein the second memory comprises magnetic storage.

15. The card of claim 14, wherein the magnetic storage comprises a strip located parallel to an edge of the card body, the strip configured to engage a swipe-to-bill telephone.

16. The card of claim 15, wherein the second memory contains the autodial information.

17. The card of claim 16, wherein autodial information comprises a single telephone number pertaining to the cardholder.

18. The card of claim 17, wherein the autodial information further comprises instructions, the instructions configured to cause the swipe-to-bill telephone to automatically dial the telephone number when the strip engages the swipe-to-bill telephone.

19. The card of claim 17, wherein the autodial information further comprises instructions, the instructions configured to cause the swipe-to-bill telephone to display the pictures for selection by the cardholder when the strip engages the swipe-to bill telephone, the instructions further configured to dial the telephone number associated with the picture selected by the cardholder.

20. A secure personal identification card system, the system comprising:
    a plurality of cards, each of the plurality of cards comprising:
        at least one memory affixed to the card, the memory containing personal information pertaining to a cardholder; and
        an interface, the interface communicating with the memory; and
    a plurality of dedicated readers, each of the plurality of readers configured to communicate with the interface of each of the plurality of cards, each reader of the plurality of the readers further configured to display the personal information contained in the memory of each of the plurality of cards, wherein a given reader displays the personal information contained in a given card to an operator of the given reader when the given card one of the plurality of cards is engaged in the given reader.

21. The system of claim 20, wherein at least one memory comprises a microchip.

22. The system of claim 21, wherein the personal information comprises information identifying the cardholder.

23. The system of claim 22, wherein the personal information further comprises medical information pertaining to the cardholder.

24. The system of claim 23, wherein the personal information further comprises pictures or graphical information.

25. The system of claim 20, wherein the interface is further configured to not communicate with a reader other than the plurality of dedicated readers.

26. The system of claim 20, wherein each of the plurality of dedicated readers is further configured to communicate with the remaining of the plurality of dedicated readers.

27. The system of claim 26, wherein the communication between the plurality of dedicated readers comprises communication through a telephone network.

28. The system of claim 27, wherein the communication between the plurality of dedicated readers further comprises communication through a computer network.

29. The system of claim 28, wherein the communication between the plurality of dedicated readers further comprises a first of the plurality of dedicated readers accessing the personal information from a memory of a card engaged with the first reader and communicating the personal information to a second of the plurality of dedicated readers.

30. An autodial identification card for use with a telephone, the card comprising:

at least one memory affixed to the card, the memory containing pertaining to a cardholder; and an interface in communication with the memory, the interface configured to communicate the information in the memory to a telephone when the card engages the telephone;

the information comprising:

a plurality of telephone numbers pertaining to a cardholder;

a plurality of images, each of the plurality of images associated one of the plurality of telephone numbers;

graphical user interface logic, the graphical user interface logic configured to display the plurality of images on a display of the telephone when the card engages the telephone, the graphical user interface logic further configured to allow the cardholder to select one of the plurality of displayed images; and operating instructions, the operating instructions configured to cause the telephone to automatically dial the telephone number associated with the image selected by the cardholder.

31. The card of claim 30, wherein the memory comprises a microchip.

32. The card of claim 31, wherein the memory comprises magnetic data storage.

33. The card of claim 32, wherein the magnetic data storage is configured as a strip parallel to an edge of the card.

34. The card of claim 33, wherein the magnetic data storage is further configured to engage a swipe-to-bill telephone.

35. The card of claim 34, wherein the operating instructions are further configured with a payment system for the swipe-to-bill telephone.

36. The card of claim 35, wherein the payment system further comprises a pre-paid system.

37. The card of claim 35, wherein the payment system further comprises billing a telephone call to an account associated with a purchaser of the card.

38. A method for providing a secure autodial personal identification card, the method comprising:

obtaining personal information pertaining to a cardholder from a purchaser, the personal information comprising identification information pertaining to the cardholder and at least one telephone number pertaining to the cardholder;

programming the personal information into at least one memory affixed to a wallet-sized card, the card configured to communicate with a reader when the card is engaged with the reader, the card further configured to communicate with a telephone when the card is engaged with the telephone; and providing the card to the purchaser.

39. The method of claim 38, wherein the method further comprises providing a secure reader to emergency agencies, the secure reader configured to read the personal information stored in at least one of the memories affixed to the card.

40. The method of claim 39, wherein the step of providing a secure reader to emergency agencies further comprises selling a plurality of dedicated readers, the dedicated readers configured to only operate with the card.

41. The method of claim 40, wherein the plurality of dedicated readers are further configured such that each of the plurality of dedicated readers communicates with the remaining of the plurality of readers.

42. The method of claim 41, wherein the communication between the plurality of dedicated readers comprises a first of the plurality of dedicated readers obtaining information from a memory of a card and communicating the information to a second of the plurality of dedicated readers.

43. The method of claim 38, wherein the step of programming the personal information further comprises programming the identification information into a first memory, and programming the telephone numbers into a second memory.

44. The method of claim 43, wherein the personal information further includes images or pictures.

45. The method of claim 44, wherein the second memory further comprises magnetic data storage, the magnetic data storage configured to operate with a swipe-to-bill telephone.

46. The method of claim 45, wherein the step of programming the personal information further comprises programming operating instructions into the magnetic data storage, the operating instructions configured to cause the swipe-to-bill telephone to dial the telephone numbers stored in the magnetic data storage when the magnetic data storage engages a swipe-to-bill telephone.

* * * * *